(12) United States Patent
Uchida et al.

(10) Patent No.: US 10,330,276 B2
(45) Date of Patent: Jun. 25, 2019

(54) VEHICULAR HEADLAMP

(71) Applicant: Koito Manufacturing Co., Ltd., Tokyo (JP)

(72) Inventors: Naoki Uchida, Shizuoka (JP); Noriko Sato, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/719,876

(22) Filed: Sep. 29, 2017

(65) Prior Publication Data

US 2018/0106455 A1     Apr. 19, 2018

(30) Foreign Application Priority Data

Oct. 14, 2016 (JP) ................................. 2016-202426

(51) Int. Cl.
  *F21V 9/00* (2018.01)
  *F21S 41/675* (2018.01)
  (Continued)

(52) U.S. Cl.
  CPC .......... *F21S 41/675* (2018.01); *B60Q 1/0683* (2013.01); *B60Q 1/14* (2013.01);
  (Continued)

(58) Field of Classification Search
  CPC ........ F21S 41/675; F21S 41/285; F21S 41/25; F21S 41/176; F21S 41/19; F21S 41/255;
  (Continued)

(56) References Cited

U.S. PATENT DOCUMENTS

| 2007/0153397 A1* | 7/2007 | Destain .............. G02B 19/0066 359/649 |
| 2012/0127435 A1* | 5/2012 | Kitano ................. G03B 21/204 353/20 |
| 2018/0045393 A1* | 2/2018 | Yagi ...................... F21S 41/675 |

FOREIGN PATENT DOCUMENTS

| JP | 07044029 Y | 10/1995 |
| JP | 2013-101985 A | 5/2013 |

(Continued)

OTHER PUBLICATIONS

An Office Action dated Dec. 7, 2018, issued from the Korean Intellectual Property Office (KIPO) of Korean Patent Application No. 10-2017-0133202 and an English translation thereof.

*Primary Examiner* — Thien T Mai
(74) *Attorney, Agent, or Firm* — Abelman Frayne & Schwab

(57) ABSTRACT

Provided is a vehicular headlamp including an excitation light source, a phosphor excited by the excitation light source, a projection lens, and a scanning mechanism configured to receive light generated by an excitation light source array on a reflective surface of a reflector and scan the light toward the phosphor. The excitation light source is formed as the excitation light source array having a plurality of light emitting portions. Between the excitation light source array and the scanning mechanism, a lens array having a plurality of light condensing portions is provided. The plurality of light condensing portions are arranged to respectively face the plurality of light emitting portions, and configured to condense lights emitted from respective light emitting portions on the reflective surface, respectively, and arrange respective optical images of reflected lights on the phosphor.

9 Claims, 7 Drawing Sheets

(51) Int. Cl.
*F21S 41/30* (2018.01)
*F21S 41/25* (2018.01)
*F21S 41/20* (2018.01)
*B60Q 1/068* (2006.01)
*B60Q 1/14* (2006.01)
*F21V 5/00* (2018.01)
*F21S 41/19* (2018.01)
*F21S 41/125* (2018.01)
*F21S 41/29* (2018.01)
*F21S 41/255* (2018.01)
*F21S 41/265* (2018.01)
*F21S 41/39* (2018.01)
*F21S 41/32* (2018.01)
*F21S 41/16* (2018.01)
*F21S 41/176* (2018.01)

(52) U.S. Cl.
CPC ............. *F21S 41/125* (2018.01); *F21S 41/16* (2018.01); *F21S 41/176* (2018.01); *F21S 41/19* (2018.01); *F21S 41/25* (2018.01); *F21S 41/255* (2018.01); *F21S 41/265* (2018.01); *F21S 41/285* (2018.01); *F21S 41/295* (2018.01); *F21S 41/30* (2018.01); *F21S 41/321* (2018.01); *F21S 41/39* (2018.01); *F21V 5/007* (2013.01)

(58) Field of Classification Search
CPC .......... F21S 41/321; F21S 41/16; F21S 41/39; F21S 41/265; F21S 41/295; F21S 41/125; F21S 41/30; F21V 9/30; F21V 5/007; B60Q 1/0683; B60Q 1/14; G02B 26/0833; G02B 26/0816; G02B 26/101
See application file for complete search history.

(56) References Cited

FOREIGN PATENT DOCUMENTS

| | | |
|---|---|---|
| JP | 2014-065499 A | 4/2014 |
| WO | 2015/170696 A | 11/2015 |

* cited by examiner

FIG. 5A
FIG. 5B
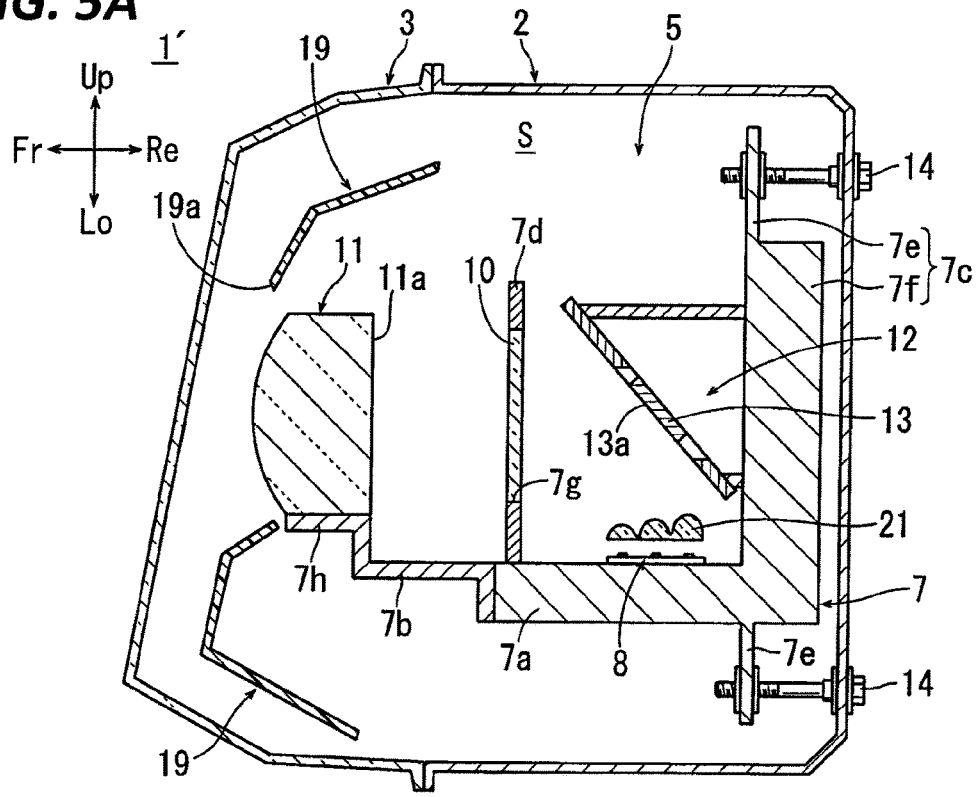
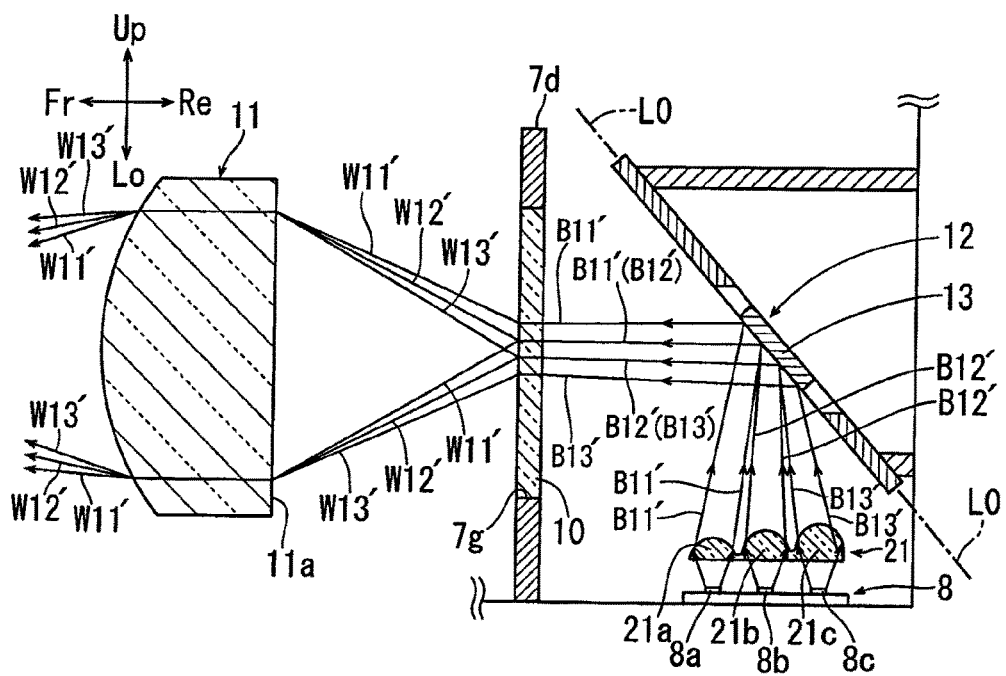

VEHICULAR HEADLAMP

CROSS-REFERENCE TO RELATED APPLICATIONS

This application is based on and claims priority from Japanese Patent Application No. 2016-202426, filed on Oct. 14, 2016 with the Japan Patent Office, the disclosure of which is incorporated herein in its entirety by reference.

TECHNICAL FIELD

The present disclosure relates to a vehicular headlamp which facilitates the control of a scanning mechanism for forming a light distribution pattern and improves a scanning performance.

BACKGROUND

Japanese Patent Laid-Open Publication No. 2014-065499 discloses a vehicular headlamp in which the lights emitted from a pair of solid state light sources that generate light emitting diode (LED) light or laser light are reflected and scanned toward a phosphor by a pair of MEMS mirrors (scanning mechanism) corresponding to the pair of solid state light sources, and the lights are transmitted from the phosphor to an optical system (projection lens), thereby forming a light distribution pattern in front of a vehicle.

SUMMARY

The MEMS mirrors of the vehicular headlamp in Japanese Patent Laid-Open Publication No. 2014-065499 form a planar light distribution pattern in the front side by scanning the light emitted from one light source with mirrors that are tilted two-dimensionally. However, the two-dimensionally tiltable MEMS mirrors have a problem in that the structure and control of the MEMS mirrors become complicated since the mirrors are oscillated around two axes, respectively.

Therefore, the inventors of the present application have considered facilitating the configuration and control of a vehicular headlamp including an MEMS mirror by arranging and irradiating a plurality of lights generated from a plurality of solid state light sources such as, for example, LED light sources or laser light sources, onto a one-dimensionally tiltable MEMS mirror, one-dimensionally scanning the plurality of arranged and reflected lights while turning on/off the lights for each light source at a predetermined position, and then forming a light distribution pattern by stacking line images each drawn in a one-dimensional direction by each light source.

However, arranging and irradiating lights from a plurality of solid state light sources to one MEMS mirror has a problem in that the scanning performance is lowered since it is required to form a large mirror in order to secure a light receiving range and a large driving force is required for quick operation of the mirror.

The present disclosure provides a vehicular headlamp which facilitates the control of a scanning mechanism configured to form a light distribution pattern and improves the scanning performance of the scanning mechanism.

The present disclosure relates to a vehicular headlamp including an excitation light source, a phosphor excited by the excitation light source, a projection lens, and a scanning mechanism configured to receive lights generated by the excitation light source on a reflective surface of a reflector and scan the lights toward the phosphor. The excitation light source is formed as an excitation light source array having a plurality of light emitting portions. Between the plurality of excitation light sources and the scanning mechanism, a lens array having a plurality of light condensing portions is provided and the plurality of light condensing portions are arranged to face the plurality of light emitting portions, respectively, and configured to respectively condense lights emitted from each of the light emitting portions on the reflective surface of the reflector, and arrange respective optical images of reflected lights on the phosphor.

(Action) Even when the lights emitted from the plurality of excitation light sources are incident on one reflector, since each of light condensing portions of the lens array condenses the light from the corresponding light emitting on the reflective surface of the reflector of the scanning mechanism to reflect each optical image of the reflected light on the phosphor so that the respective optical images are arranged and thus the incident ranges of the lights from respective light emitting portions on the reflective surface are further narrowed, it is possible to minimize the area of the reflective surface of the reflector as much as possible, and to perform scanning without a gap due to the respective optical images on the phosphor.

Further, in the vehicular headlamp, the lens array is formed so as to cause the lights, which are respectively emitted from the light emitting portions and condensed by the light condensing portions, to be arranged and to be adjacent to each other on the reflective surface.

(Action) Since a plurality of lights condensed on the reflective surface by the lens array are arranged and adjacent to each other on the reflective surface, the incident ranges of the plurality of lights from respective light emitting portions to the reflective surface become further narrower and as a result, the area of the reflective surface of the reflector may be minimized.

In addition, in the vehicular headlamp, the light condensing portions of the lens array are formed to have different light condensing magnifications, respectively.

(Action) Since the light condensing magnifications of the lights that pass through respective light condensing portions of the lens array are different from each other, lights each having a size based on the light condensing magnification for each of the plurality of excitation light sources are incident on the reflective surface of the reflector, and are scanned by the scanning mechanism.

Further, the plurality of light emitting portions are formed such that brightness may be adjusted for each light emitting portion.

(Action) A light distribution pattern is formed by a combination of lights having different brightnesses for respective excitation light sources.

According to the vehicular headlamp, even when the lights emitted from the plurality of light emitting portions are scanned by a scanning mechanism having one reflector, the incident range of a light emitted from each light emitting portion on the reflective surface is narrowed, so that it is possible to form the reflector of the scanning mechanism to be compact. By performing scanning while swinging the reflector around one axis, the control of the scanning mechanism is simplified and facilitated, and by quickly operating the reflector with a small driving force, it is also possible to improve the scanning performance so that a light distribution pattern may be formed without color irregularity.

According to the vehicular headlamp, because the incident range of the plurality of lights irradiated on the reflective surface becomes further narrower, it is possible to form the reflector to be more compact, and as a result, it is possible to operate the reflector with a smaller driving force to improve the scanning performance.

According to the vehicular headlamp, since the incident range of the lights incident on the reflective surface of the reflector is adjusted for each light emitting portion of the excitation light source array, it is possible to form the reflector to be more compact by further narrowing the incident range of the plurality of lights and to implement various light distribution pattern controls.

According to the vehicular headlamp, it is possible to implement various light distribution pattern controls by scanning and combining lights of different brightnesses for respective light emitting portions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5A is a cross-sectional view illustrating the vehicular headlamp according to a second exemplary embodiment, which includes a lens array having a plurality of light condensing portions, the light condensing magnifications of which are different from each other, and FIG. 5B is an explanatory view illustrating optical paths in the vehicular headlamp of the second exemplary embodiment, in which the optical paths are viewed from the left side.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Exemplary embodiments of the present disclosure will be described below based on FIGS. 1 to 7. In each figure, the directions of the respective portions of the vehicular headlamp or the road viewed from the driver of a vehicle mounted with the vehicular headlamp are described as upper (Up), lower (Lo), left (Le), right (Ri), front (Fr), and rear (Re).

Figure 1:
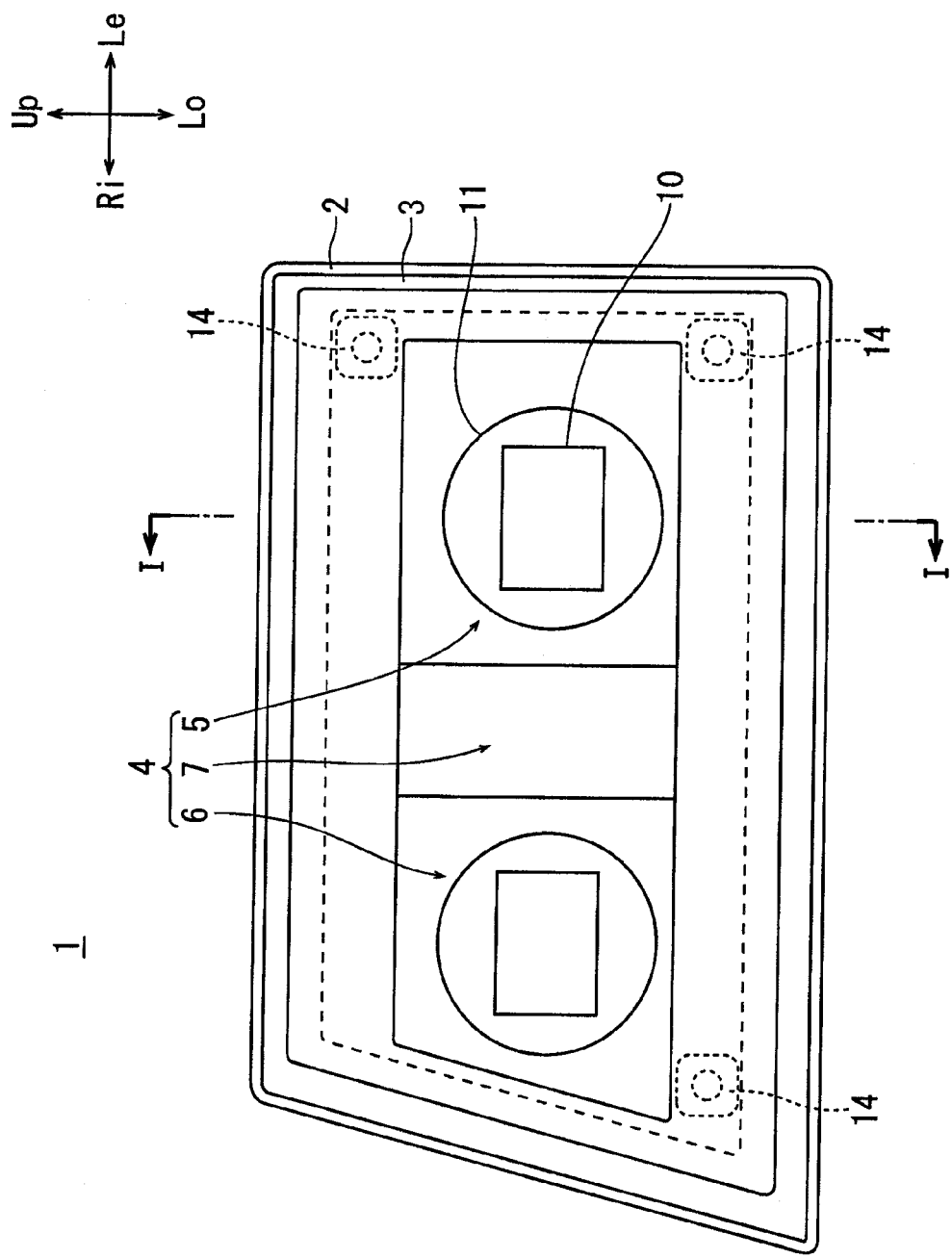
FIG. 1 is a front view of a vehicular headlamp according to a first exemplary embodiment.

The vehicular headlamp according to the first exemplary embodiment will be described with reference to FIGS. 1 to 4. A vehicular headlamp 1 of the first exemplary embodiment represents an exemplary right headlamp including an excitation light source array 8 provided with light emitting portions 8a to 8c that form a plurality of excitation light sources, and a lens array 9 having a plurality of light condensing portions 9a to 9c the light condensing magnifications of which are different from each other. FIG. 1 is a front view of a vehicular headlamp 1 according to the first exemplary embodiment, FIG. 2A is a cross-sectional view of the vehicular headlamp 1 according to the first exemplary embodiment, which is taken along line I-I of FIG. 1, and FIG. 2B is a view illustrating optical paths in the vehicular headlamp 1.

Figure 2A:
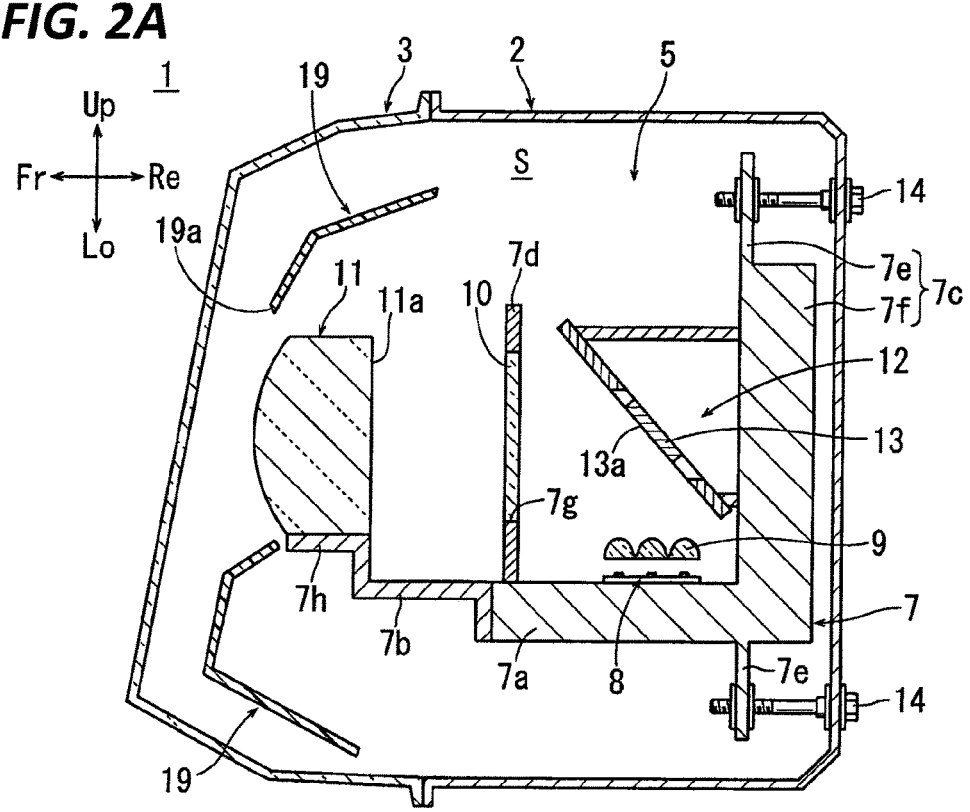
FIG. 2A is a cross-sectional view taken along line I-I of the vehicular headlamp according to the first exemplary embodiment, which includes a lens array having a plurality of light condensing portions the light condensing magnifications of which are the same as each other.
Figure 2B:
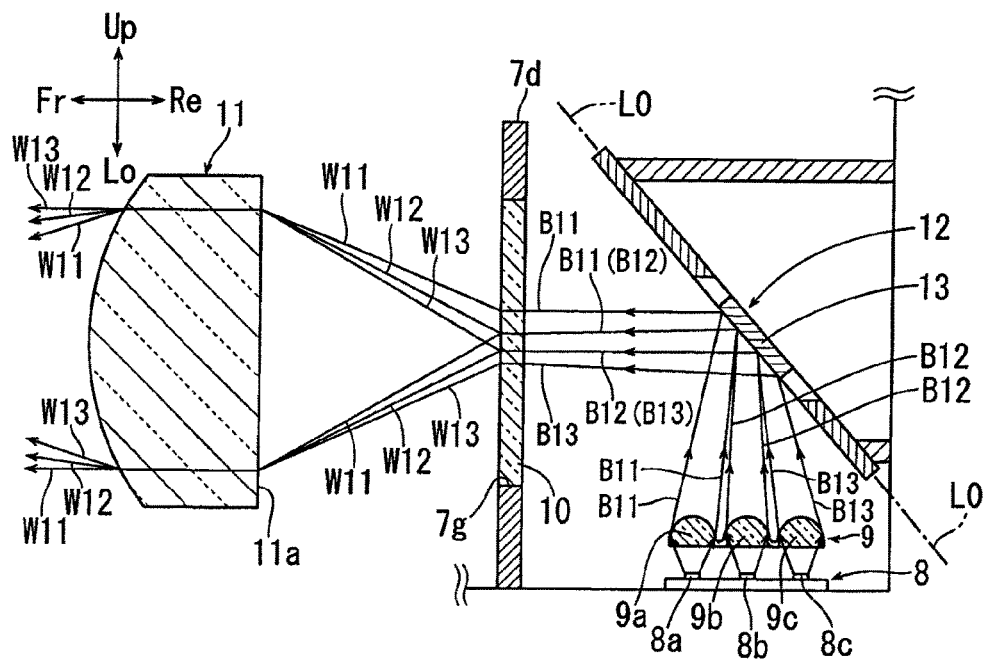
FIG. 2B is an explanatory view illustrating optical paths in the vehicular headlamp of the first exemplary embodiment, in which the optical paths are viewed from the left side.

The vehicular headlamp 1 in the first exemplary embodiment as illustrated in FIGS. 1 and 2A includes a lamp body 2, a front cover 3, and a headlamp unit 4. The lamp body 2 has an opening in the front side of the vehicle, and the front cover 3 is formed of, for example, a light-transmissive resin or glass and is attached to the opening of the lamp body 2 so as to define a lamp chamber S inside the lamp body 2. The headlamp unit 4 illustrated in FIG. 1 is configured by integrating a high beam headlamp unit 5 and a low beam headlamp unit 6 with a metallic support member 7, and is disposed inside the lamp chamber S.

Each of the high beam headlamp unit 5 and the low beam headlamp unit 6 has an excitation light source array 8, a lens array 9, a phosphor 10, a projection lens 11, and a scanning mechanism 12, as illustrated in FIG. 2A, and these components are attached to a support member 7.

The support member 7 illustrated in FIG. 2A is formed of a metal and includes a bottom plate portion 7a extending in the horizontal direction, a stepwise lens support portion 7b integrated with the edge of the bottom plate portion 7a by, for example, welding, a plate-shaped base plate portion 7c extending in the vertical direction from the base end of the bottom plate portion 7a, and a frame 7d having a rectangular hole 7g and projecting upward from the bottom plate portion 7a. The base plate portion 7c is configured by a screw fixing portion 7e and a holding portion 7f which is thicker in the depth direction than the screw fixing portion 7e.

As illustrated in FIGS. 2A and 2B, the excitation light source array 8 includes a plurality of light emitting portions which are excitation light sources composed of blue or violet LED light sources or laser light sources and are provided with a first light emitting portion 8a, a second light emitting portion 8b, and a third light emitting portion 8c which are arranged in the front and rear direction, and is fixed to the bottom plate portion 7a of the metal support member 7. The first to third light emitting portions 8a to 8c have the same shape and emit lights upward. Further, the first to third light emitting portions 8a to 8c are individually turned on/off by a control mechanism (not illustrated), and the brightness thereof is individually adjusted so that various light distribution patterns may be formed. The heat generated in the excitation light source array 8 during the turning-on thereof is discharged into the lamp chamber S via the bottom plate portion 7a of the metal support member 8.

As illustrated in FIGS. 2A and 2B, the lens array 9 has a configuration in which transparent or semi-transparent first light condensing portion 9a, second light condensing portion 9b, and third light condensing portion 9c having a plano-convex lens shape with the same thickness are continuously connected from the front side to the rear side. The first light condensing portion 9a and the third light condensing portion 9c are formed such that the respective lights to be transmitted are slightly inclined toward the second light condensing portion 9b so as to be adjacent to the light of the second light condensing portion 9b. The lens array 9 is fixed to one of the bottom plate portion 7a and the base plate portion 7c of the support member 7 in a state where the first to third light condensing portions 9a to 9c are arranged to face the corresponding first to third light emitting portions 8a to 8c, respectively. The lights B11, B12, and B13 emitted from the first to third light emitting portions 8a to 8c of the excitation light source array 8 pass through the first to third light condensing portions 9a to 9c and are arranged vertically and adjacent to each other on a reflective surface 13a of a reflector 13 (to be described later).

As illustrated in FIGS. 1, 2A, and 2B, the phosphor 10 is formed in a rectangular shape and is fixed in a state of being engaged in the rectangular hole 7g of the frame 7d of the support member 7 so as to be positioned near the rear focal point of the projection lens 11. Further, in order to whiten transmitted lights, when the excitation light source array 8 generates a blue light, the phosphor 10 is formed as a yellow phosphor, and when the light excitation light source array 8 generates a violet light, the phosphor 10 is formed as a yellow and blue phosphor or as phosphor having at least three colors of red, green, and blue (RGB).

The projection lens 11 illustrated in FIG. 2A is a planoconvex lens that is convex forward and is fixed to a holding portion 7h at the tip end of the lens support portion 7b in a state where the rear surface 11a faces the phosphor 10. Three aiming screws 14 rotatably held to the lamp body 2 are screwed to the screw fixing portion 7e of the base plate portion 7e of the support member 7 so that the headlamp unit 4 is tiltably supported with respect to the lamp body 2.

Figure 3:
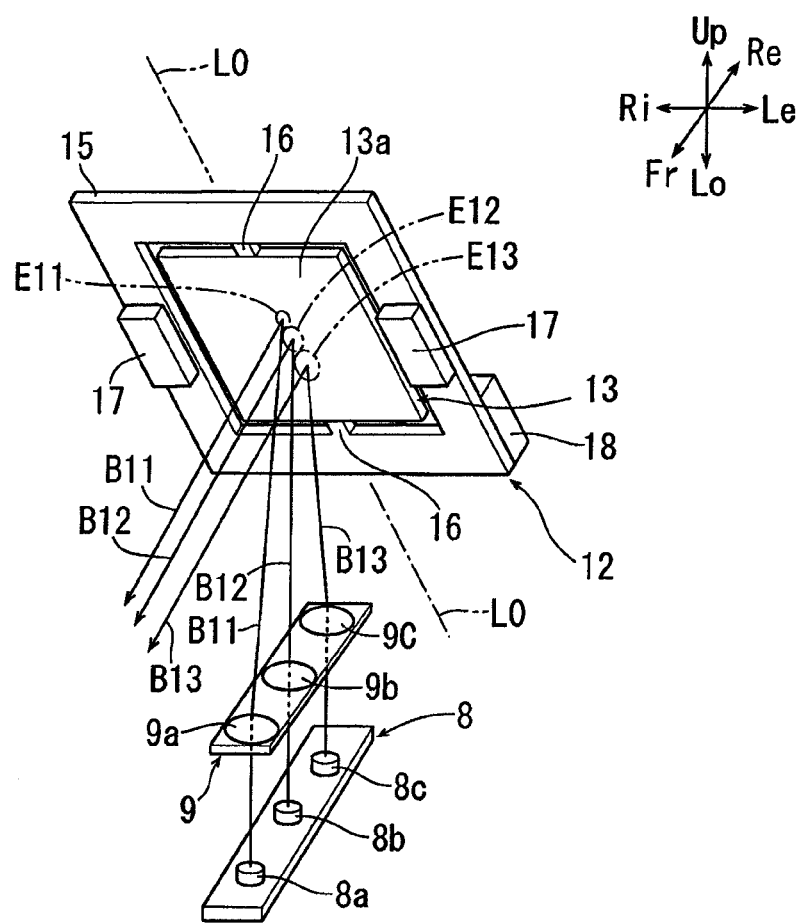
FIG. 3 is a perspective view illustrating a scanning mechanism of the first exemplary embodiment which is viewed obliquely from the front side of a reflector.

As illustrated in FIG. 3, the scanning mechanism 12 illustrated in FIG. 2A is a scanning device having a plate-shaped reflector 13 that is tiltable in one axial direction around a rotation central axis L0, and is fixed to the front surface of the holding portion 7f of the support member 7. As illustrated in FIG. 2B, the reflector 13 includes the reflective surface 13a formed by, for example, silver deposition or plating on the front side thereof, and the reflective surface 13a is arranged to face both the first to third light condensing portions 9a to 9c of the lens array 9 and the phosphor 10. For the scanning mechanism 12, various scanning mechanisms such as, for example, a Galvano mirror may be adopted, besides a MEMS mirror.

Further, the scanning mechanism 12 illustrated in FIG. 3 includes a reflector 13, a base 15, a pair of torsion bars 16, a pair of permanent magnets 17, and an end portion 18. The reflector 13 is supported by the base 15 in a state where the reflector 13 is tiltable left and right around the rotation central axis L0 by the pair of torsion bars 16. The pair of permanent magnets 17 is provided in the base 15 in a direction orthogonal to the rotation central axis L0. The reflector 13 is provided with coils (not illustrated) that are individually controlled by a control mechanism (not illustrated) and are powered through a terminal portion 18 to generate an electric field. The reflector 13 is reciprocally tilted left and right around the rotation central axis L0 of the torsion bars 16 based on the control of the power on/off to the coils (not illustrated) and scans the lights B11 to B13 reflected by the reflective surface 13a left and right.

In the meantime, the respective light condensing magnifications and focal lengths of the first to third light condensing portions 9a to 9c of the lens array 9 are the same as each other by forming the respective light condensing portions to have the same thickness and substantially the same size. Since the reflector 13 is arranged obliquely such that the front side is higher than the rear side so as to face both the lens array 9 and the phosphor 10 when the distances from the respective light condensing portions 9a to 9c to the incident position of the reflective surface 13a are SN1, SN2, and SN3, the above distances are SN1>SN2>SN3, and the reaching distance of the lights to the reflective surface 13a becomes longer toward the light condensing portion arranged at the front side.

When the distances SN1, SN2, and SN3 from the respective light condensing portions to the respective incident positions are less than or equal to the respective focal lengths of the first to third light condensing portions 9a to 9c, the incident ranges E11, E12, and E13 of the respective lights B11, B12, and B13 which pass through the first to third light condensing portions 9a to 9c and are incident on the reflective surface 13a become smaller as the distance from each light condensing portion to the incident position of the reflective surface 13a becomes longer, as illustrated in FIG. 3. In the meantime, when the distances SN1, SN2, and SN3 from the respective light condensing portions to the respective incident positions are equal to or greater than the respective focal lengths of the first to third light condensing portions 9a to 9c, the incident ranges E11, E12, and E13 become wider as the distance from each light condensing portion to the incident position of the reflective surface 13a becomes longer (not illustrated).

The diffusing property of each of the reflected lights B11, B12, and B13 reflected by the reflective surface 13a in a state of being condensed by the first to third light condensing portions 9a to 9c is inversely proportional to the magnitude of the incident ranges E11, E12, and E13 of the lights on the reflective surface 13a. Thus, in the vehicular headlamp 1 of the first exemplary embodiment illustrated in FIGS. 2B and 3, the diffusing property of the reflected light B11, which has the smallest incident range E11 among the reflected lights B11, B12, and B13, is the greatest, and the diffusing property of the reflected light B13, which has the greatest incident range E13, is the smallest.

The first light condensing portion 9a and the third light condensing portion 9c illustrated in FIGS. 2A and 2B are formed to be slightly inclined toward the second light condensing portion 9b so that the incident ranges E11 and E13 of the respective lights B11 and B13 passing therethrough, as illustrated in FIG. 3, are adjacent to the optical image incident range E12 of the light B12 passing through the second light condensing portion 9b. The lights B11, B12, and B13 emitted from the first light condensing portion 9a, the second light condensing portion 9b, and the third light condensing portion 9c, respectively, are sequentially arranged upward from the light B11, which has the smallest incident range E11, on the reflective surface 13a in a vertical row and are incident in a state of being adjacent to each other.

According to the lens array 9 of the first exemplary embodiment illustrated in FIGS. 2B and 3, the plurality of lights B11 to B13 emitted from the excitation light source array 8 pass through the corresponding first to third light condensing portions 9a to 9c of the lens array 9, respectively, and are arranged in a vertical row within a predetermined range on the reflective surface 13a of the reflector 13 so that the incident range on the reflective surface 13a may be narrowed vertically. Thus, the reflector 13 may be formed to be compact by narrowing the reflective surface 13a. Further, according to the lens array 9, the incident ranges E11, E12, and E13 of the lights B11, B12, and B13 on the reflective surface 13a are arranged and adjacent to each other so that the reflective surface 13a may be further narrowed and the reflector 13 may be made to be more compact. As a result, the scanning performance by the scanning mechanism may be improved.

Figure 4:
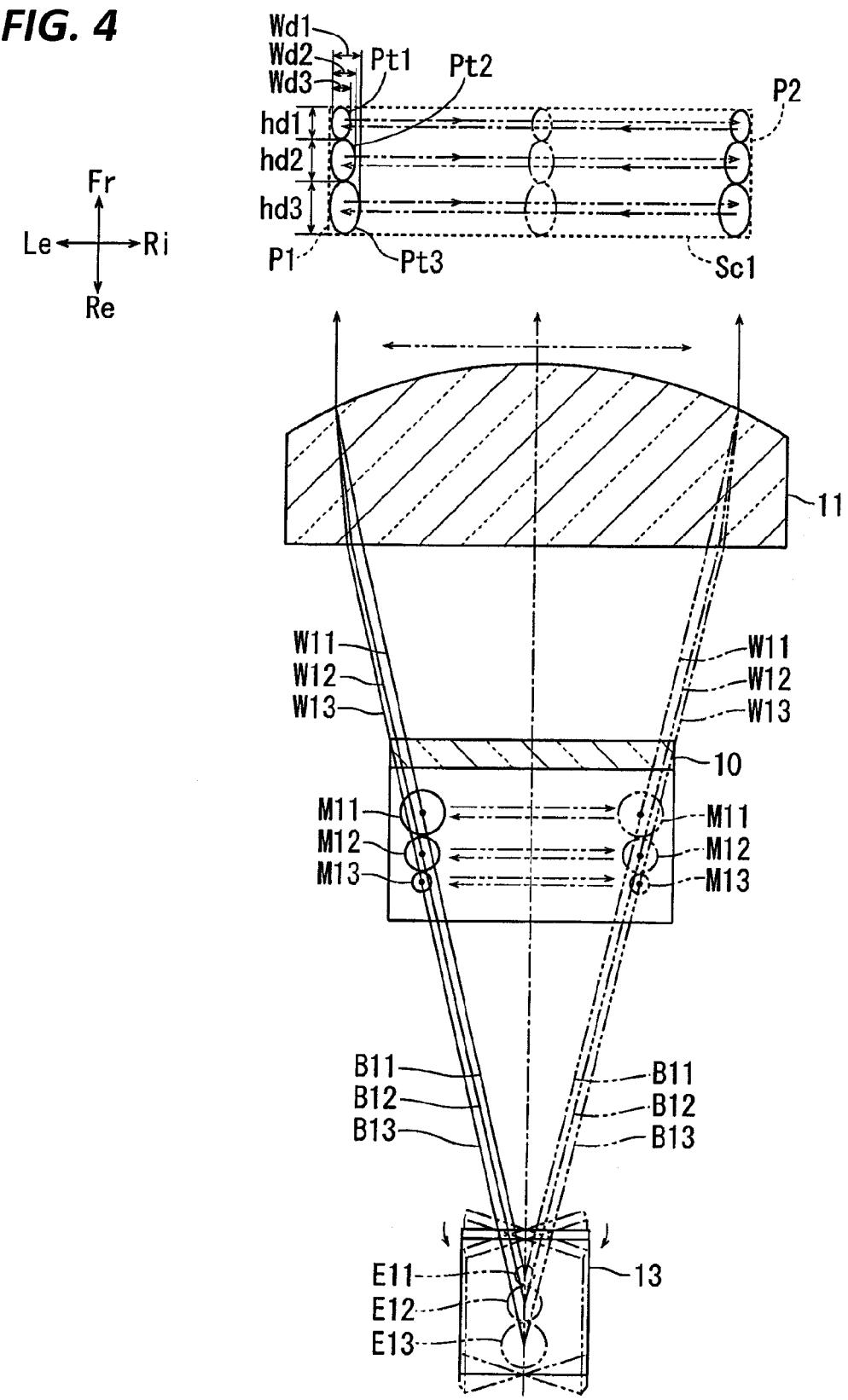
FIG. 4 is an explanatory view illustrating optical paths and optical images formed by the vehicular headlamp of the first exemplary embodiment.

Here, a method of forming a light distribution pattern for white high beam by the vehicular headlamp 1 of the first exemplary embodiment will be described with reference to FIGS. 2B, 3, and 4. As illustrated in FIG. 4, the lights B11, B12, and B13 emitted from the first light emitting portion 8a, the second light emitting portion 8b, and the third light emitting portion 8c of the excitation light source array 8 are incident to be condensed by the corresponding first light condensing portion 9a, the second light condensing portion 9b, and the third light condensing portion 9c of the lens array 9, to be arranged in a vertical row on the reflective surface 13a of the reflector 13, and to be adjacent to each other.

The reflected lights B11, B12, and B13 by the reflective surface 13a are arranged in a vertical row on the phosphor 10 so as to be condensed near the rear focal point of the projection lens 11, as illustrated in FIGS. 2B and 4, and display the adjacent optical images M11, M12, and M13, respectively. Since the heights of the optical images M11, M12, and M13 are different depending on the sizes of the diffusing properties of the reflected lights B11, B12, and B13, and are inversely proportional to the incident ranges E11, E12, and E13 on the reflective surface 13a, the height of the optical image M11 is the highest and the height of the optical image M13 is the lowest.

As illustrated in FIGS. 2B and 4, the lights B11, B12, and B13 that display the optical images M11, M12, and M13 become white lights W11, W12, and W13, respectively, by passing through the phosphor 10. By being transmitted through the projection lens 11, the white lights W11, W12, and W13 pass through a front end opening 19a of an extension reflector 19 in the state where the irradiation positions of the white lights W11 and W13 are vertically reversed about the white light W12, that is, the white light W11 is directed to the lower side of the white light W12 and the white light W13 is directed to the upper side of the white light W12. Also, by being individually transmitted through the front cover 3, the white lights W11, W12, and W13 display the optical images Pt1, Pt2, and Pt3 that are arranged in a vertical row and adjacent to each other, in front of the vehicle (not illustrated). The optical images Pt1, Pt2, and Pt3 have a similar shape to the optical images M11, M12, and M13, and have a positional relationship in which the optical images M11 and M13 are vertically reversed about the optical image M12. That is, when the heights of the optical images Pt1, Pt2, and Pt3 are hd1, hd2, and hd3, respectively, and the widths of the optical images Pt1, Pt2, and Pt3 are Wd1, Wd2, and Wd3, respectively, the heights and widths of the respective optical images satisfy the following relationships: hd1<hd2<hd3 and Wd1<Wd2<Wd3.

In the rectangular scanning area (symbol Sc1) in front of the vehicle, the excitation light source array 8 independently turns on the first to third light emitting portions 8a to 8c only at a predetermined position that displays a light distribution pattern, based on the control of a lighting control device (not illustrated) and the scanning mechanism 12 reciprocally tilts the reflector 13 at high speed around the rotation central axis L0 so that the respective optical images Pt1, Pt2, and Pt3 from the first to third light emitting portions 8a, 8b, and 8c are scanned at high speed from the left end position P1 of the scanning area Sc1 to the right end position P2 thereof. By scanning, at high speed, the optical images Pt1, Pt2, and Pt3 having different heights and turned on/off at a predetermined position, the scanning mechanism 12 vertically stacks white line images of different thicknesses drawn on the left and right sides, thereby displaying various shapes of light distribution patterns for high beam in front of the vehicle. The low beam headlamp unit 6 also displays the low beam light distribution pattern by performing the same scanning.

Next, a vehicular headlamp 1' according to a second exemplary embodiment will be described below with reference to FIGS. 5A, 5B, 6 and 7. The vehicular headlamp 1' of the second exemplary embodiment has the same configuration as the vehicular headlamp 1 of the first exemplary embodiment, except that a lens array 21 is different from the lens array 9 of the first exemplary embodiment. FIG. 5A is a vertical cross-sectional view obtained assuming that the vehicular headlamp 1' of the second exemplary embodiment is taken along line I-I of FIG. 1, and FIG. 5B is a view illustrating optical paths formed by the vehicular headlamp 1'.

Each of the high beam headlamp unit 5' illustrated in FIG. 5A and the low beam headlamp unit (not illustrated) has an excitation light source array 8, a lens array 21, a phosphor 10, a projection lens 11, and a scanning mechanism 12, which are all attached to a support member 7.

As illustrated in FIGS. 5A and 5B, the lens array 21 has a configuration in which transparent or semi-transparent first light condensing portion 21a, second light condensing portion 21b, and third light condensing portion 21c having a plano-convex lens shape with different thicknesses are continuously connected from the front side to the rear side in the order of a small thickness. When the respective curvatures of the first to third light condensing portions 21a to 21c are set to Q1, Q2, and Q3, and the respective condensing magnifications are set to Sb1, Sb2, and Sb3, the lens array 21 is formed to have a condensing magnification of Sb1<Sb2<Sb3 since the curvatures of the first to third light condensing portions 21a to 21c are formed to be Q1<Q2<Q3.

The first light condensing portion 21a and the third light condensing portion 21c illustrated in FIGS. 5A and 5B are formed to be slightly inclined toward the second light condensing portion 21b so as to cause the respective lights thereof to be adjacent to the light of the second light condensing portion 21b. The lens array 21 is fixed to one of the bottom plate portion 7a or the base plate portion 7c of the support member 7 in a state where the first to third light condensing portions 21a to 21c are arranged to face the corresponding first to third light emitting portions 8a to 8c, respectively. The lights B11', B12', and B13' emitted from the first to third light emitting portions 8a to 8c of the excitation light source array 8 are irradiated to be transmitted through the first to third light condensing portions 21a to 21c such that the lights B11', B12', and B13' are arranged in the vertical direction on the reflective surface 13a of the reflector 13 (to be described later) and are adjacent to each other.

As illustrated in FIGS. 5A and 5B, since the reflector 13 is arranged obliquely such that the front side is higher than the rear side, and the respective condensing magnifications of the first to third light condensing portions 21a to 21c of the lens array 21 are Sb1<Sb2<Sb3, when the respective focal lengths of the first to third light condensing portions 21a to 21c are set to SS1, SS2, and SS3, respectively, the respective focal lengths become SS1>SS2>SS3. Further, since the reflector 13 is arranged obliquely such that the front side is higher than the rear side, in the lights transmitted through the first to third light condensing portions 21a to 21c, respectively, the distance from a light condensing portion to the incident position of a light on the reflective surface 13a becomes farther as the focal length of the light condensing portion become longer.

Figure 6:
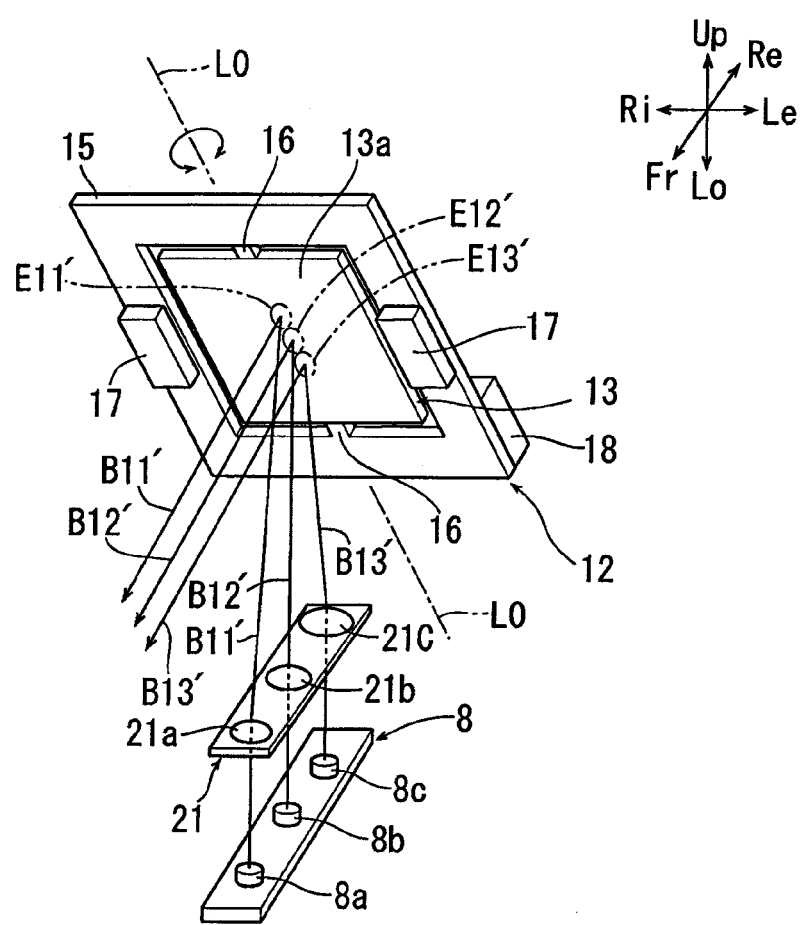
FIG. 6 is a perspective view of the scanning mechanism of the second exemplary embodiment which is viewed obliquely from the front side of a reflector.

As illustrated in FIGS. 5A, 5B, and 6, the incident ranges E11', E12', and E13' of the lights B11', B12', and B13' which are transmitted through the first light condensing portion 21a, the second light condensing portion 21b, and the third light condensing portion 21c, respectively, and are incident on the reflective surface 13a become the same as each other by arranging the reflector 13 in such a manner that the reflection position of each of the transmitting lights on the reflective surface 13a becomes farther in proportion to each of the focal lengths of the first to third light condensing portions 21a to 21c. Also, the incident ranges E11', E12', and E13' are arranged in a vertical row on the reflective surface 13a and are adjacent to each other. Further, the reflected lights B11', B12', and B13' reflected by the reflective surface 13a are diffused substantially uniformly.

According to the lens array 21 of the second exemplary embodiment illustrated in FIGS. 5A and 5B, a plurality of emitted lights B11' to B13' of the excitation light source array 8 transmitted through the corresponding first to third light condensing portions 21a to 21c of the lens array 21, respectively, so that the incident ranges E11', E12', and E13' of the lights which are incident to be arranged in a vertical row on the reflective surface 13a and adjacent to each other are uniformized and minimized so as to be narrowed vertically. As a result, according to the lens array 21, the scanning performance of the scanning mechanism 12 may be improved by forming the reflector 13 to be more compact than that in the first exemplary embodiment.

Figure 7:
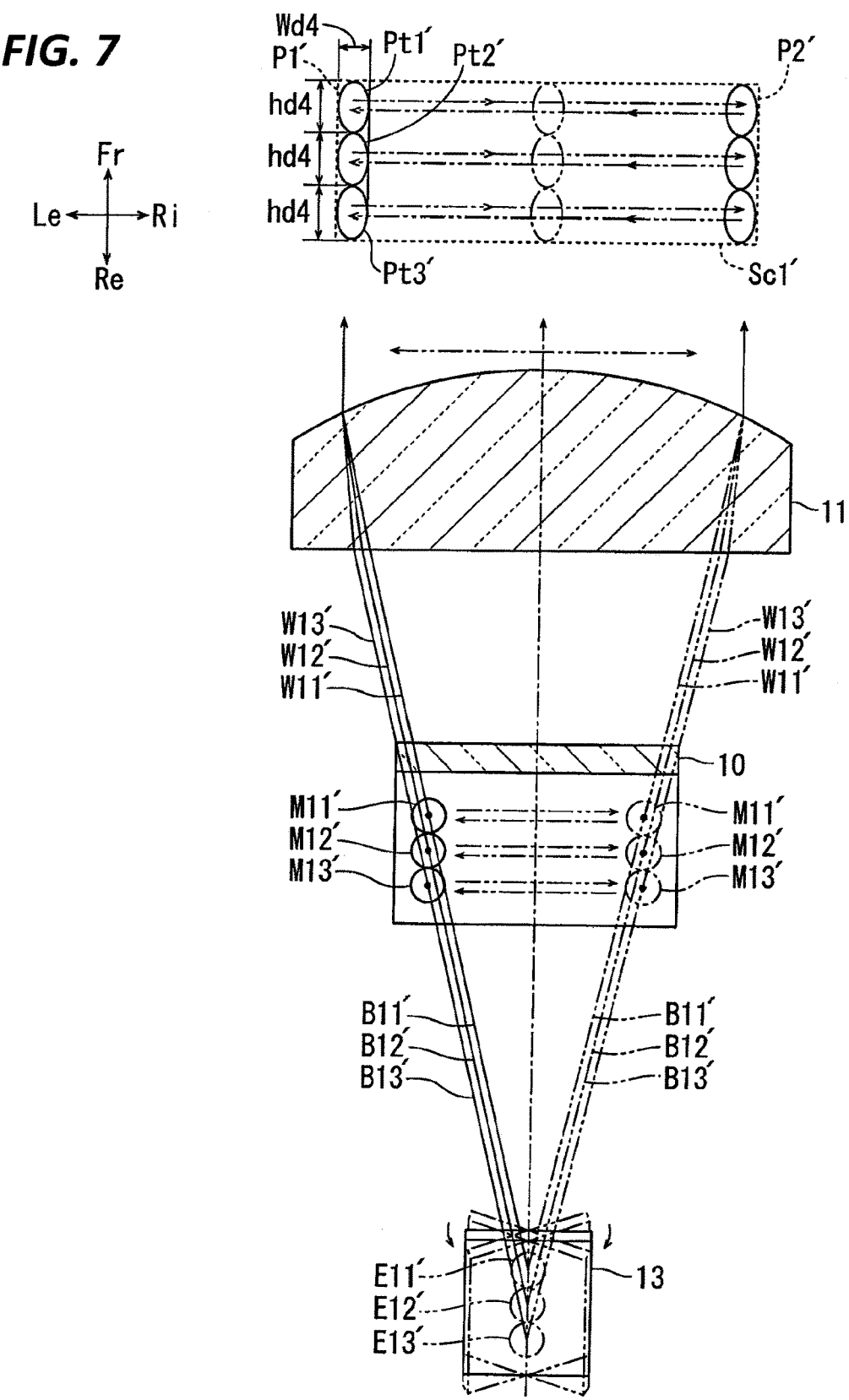
FIG. 7 is an explanatory view illustrating optical paths and optical images formed by the vehicular headlamp of the second exemplary embodiment.

Here, a method of forming a light distribution pattern for white high beam by the vehicular headlamp 1' of the second exemplary embodiment will be described with reference to FIGS. 5B, 6, and 7. As illustrated in FIG. 7, the lights B11', B12', and B13' emitted from the first light emitting portion 8a, the second light emitting portion 8b, and the third light emitting portion 8c of the excitation light source array 8 are incident to be condensed by the corresponding first light condensing portion 21a, the second light condensing portion 21b, and the third light condensing portion 21c of the lens array 21, to be arranged in a vertical row on the reflective surface 13a of the reflector 13 and to be adjacent to each other.

The reflected lights B11', B12', and B13' by the reflective surface 13a are uniformly diffused, as illustrated in FIG. 5B, are arranged in a vertical row on the phosphor 10, and display the adjacent, uniform optical images M11', M12', and M13', respectively. The lights B11', B12', and B13' that display the optical images M11', M12', and M13' become white lights W11', W12', and W13', respectively, by being transmitted through the phosphor 10. The white lights W11', W12', and W13' are transmitted through the projection lens 11 so as to pass through the front end opening 19a of the extension reflector 19 in a state where the irradiation position of the white lights W11' and W13' is vertically reversed about the white light W12'. Also, by being transmitted through the front cover 3, the white lights W11', W12', and W13' respectively display adjacent optical images Pt1', Pt2', and Pt3' in front of a vehicle (not illustrated). As illustrated in FIG. 7, the optical images Pt1', Pt2', and Pt3' are displayed in a substantially uniform shape to be similar to the optical images M11', M12', and M13', and have a uniform height hd4 and width Wd4.

In the rectangular scanning area (symbol Sc1') in front of the vehicle, as illustrated in FIG. 7, the excitation light source array 8 illustrated in FIGS. 5A and 5B individually turns on the first to third light emitting portions 8a to 8c only at a predetermined position that displays a light distribution pattern, based on the control of a lighting control device (not illustrated), and the scanning mechanism 12 reciprocally tilts the reflector 13 at high speed around the rotation central axis L0 so that the respective optical images Pt1', Pt2', and Pt3' formed by the first to third light emitting portions 8a, 8b, and 8c are scanned at high speed from the left end position P1' of the scanning area Sc1' to the right end position P2' thereof. By scanning, at high speed, the optical images Pt1', Pt2', and Pt3' turned on/off at a predetermined position and having substantially the same heights, the scanning mechanism 12 vertically stacks white line images of different thicknesses drawn on the left and right sides, thereby displaying various shapes of light distribution patterns for high beam in front of the vehicle. A low beam headlamp unit 6 also displays a low beam light distribution pattern by performing the same scanning.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicular headlamp comprising:
an excitation light source;
a phosphor excited by the excitation light source;
a projection lens; and
a scanning mechanism configured to receive light generated by the excitation light source on a reflective surface of a reflector and scan the light toward the phosphor,
wherein the excitation light source is formed as an excitation light source array having a plurality of light emitting portions arranged linearly from a front to a rear direction, and
between the plurality of excitation light sources and the scanning mechanism, a lens array having a plurality of light condensing portions corresponding to each of the plurality of excitation light sources, the plurality of light condensing portions are arranged to face the plurality of light emitting portions, respectively, and are configured to narrow incident ranges of lights respectively emitted from the light emitting portions on the reflective surface of the reflector, angle the lights to be adjacent to each other in a vertical row on the reflective surface of the reflector, and arrange respective optical images of reflected lights on the phosphor.

2. The vehicular headlamp of claim 1, wherein the light condensing portions of the lens array are formed to have the same light condensing magnifications, respectively.

3. The vehicular headlamp of claim 1, wherein the light condensing portions of the lens array are formed to have different light condensing magnifications, respectively.

4. The vehicular headlamp of claim 2, wherein the plurality of light emitting portions are formed such that brightness is adjustable for each light emitting portion.

5. The vehicular headlamp of claim 3, wherein the plurality of light emitting portions are formed such that brightness is adjustable for each light emitting portion.

6. The vehicular headlamp of claim 1, wherein the incident ranges of the respective lights incident on the reflective surface of the reflector become larger from a front to a rear direction.

7. The vehicular headlamp of claim 6, wherein the plurality of light emitting portions are formed such that brightness is adjustable for each light emitting portion.

8. The vehicular headlamp of claim 1, wherein the incident ranges of the respective lights incident on the reflective surface of the reflector are uniform in shape.

9. The vehicular headlamp of claim 8, wherein the plurality of light emitting portions are formed such that brightness is adjustable for each light emitting portion.

* * * * *